(12) United States Patent
Kimura (10) Patent No.: US 10,397,502 B2
(45) Date of Patent: Aug. 27, 2019

(54) METHOD AND APPARATUS FOR IMAGING AN OBJECT

(71) Applicant: RICOH IMAGING COMPANY, LTD., Tokyo (JP)

(72) Inventor: Yoshitaka Kimura, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 3 days.

(21) Appl. No.: 15/434,372

(22) Filed: Feb. 16, 2017

(65) Prior Publication Data

US 2018/0070034 A1  Mar. 8, 2018

(30) Foreign Application Priority Data

Sep. 6, 2016 (JP) .................. 2016-173752

(51) Int. Cl.
| | |
|---|---|
| *H04N 5/217* | (2011.01) |
| *H04N 5/357* | (2011.01) |
| *H04N 5/232* | (2006.01) |
| *H04N 5/353* | (2011.01) |
| *H04N 5/374* | (2011.01) |
| *H04N 5/378* | (2011.01) |

(52) U.S. Cl.
CPC ....... *H04N 5/3577* (2013.01); *H04N 5/23248* (2013.01); *H04N 5/23287* (2013.01); *H04N 5/3532* (2013.01); *H04N 5/3575* (2013.01); *H04N 5/3742* (2013.01); *H04N 5/378* (2013.01)

(58) Field of Classification Search
CPC .. H04N 5/3577; H04N 5/378; H04N 5/23248; H04N 5/217; H04N 5/357; H04N 1/409; H04N 1/58; H04N 5/2176
See application file for complete search history.

(56) References Cited

U.S. PATENT DOCUMENTS

| | | | | |
|---|---|---|---|---|
| 7,636,113 B2 | 12/2009 | Kato | | |
| 2007/0285538 A1* | 12/2007 | Suzuki | ................ | H04N 5/3745 348/272 |
| 2008/0258042 A1* | 10/2008 | Krymski | ............... | H04N 3/155 250/208.1 |
| 2010/0053396 A1* | 3/2010 | Okita | ................... | H04N 5/3595 348/301 |
| 2012/0162484 A1* | 6/2012 | Mo | ...................... | H04N 5/2176 348/241 |
| 2014/0368710 A1* | 12/2014 | Sohn | ................... | H04N 5/3658 348/308 |
| 2016/0330387 A1* | 11/2016 | Hwang | ................. | H04N 5/357 |
| 2016/0353033 A1* | 12/2016 | Shin | ...................... | H04N 5/378 |
| 2017/0195607 A1* | 7/2017 | Bulteel | .................. | H04N 5/378 |

FOREIGN PATENT DOCUMENTS

JP         2014-116914        6/2014

* cited by examiner

*Primary Examiner* — Kelly L Jerabek (74) *Attorney, Agent, or Firm* — Greenblum & Bernstein, P.L.C.

(57) ABSTRACT

An apparatus for imaging an object is equipped with an image sensor comprising a plurality of pixels; a charge-reading processor that reads out accumulated charges in a given pixel via a pixel circuit of the charge accumulated pixel; and a noise-reading processor that reads out noise signals from a pixel circuit for a given pixel. The noise-reading processor reads noise signals from a pixel circuit for a pixel that is an object of noise acquisition, in parallel with the reading of accumulated charges by the charge-reading processor.

15 Claims, 9 Drawing Sheets

METHOD AND APPARATUS FOR IMAGING AN OBJECT

BACKGROUND OF THE INVENTION

1. Field of the Invention

This invention relates to an image pick-up apparatus, and especially a noise reduction process for image-pixel signals read from an image sensor.

2. Description of the Related Art

In an image pick up apparatus such as a digital camera, an auto-focus mechanism or an image stabilization mechanism that is equipped with a motor, coil, etc., becomes a noise source. When image-pixel signals are read from the image sensor, noise is superimposed on the image-pixel signals. For example, as electric current flows through a voice coil in the image stabilization mechanism it produces a change in a magnetic field that causes a noise streak or stripe to occur in a photographed image.

To reduce such a noise, a dark-exposure photography procedure is carried out after a main exposure is made. Concretely, a series of drive signals such as duty ratios, which are output to the image stabilization mechanism during the main exposure, is stored in a memory and a dark-exposure is subsequently carried out while driving the image stabilization mechanism based on the stored driving signals. By subtracting noise signals that are generated in the dark exposure from image-pixel signals that are generated in the main exposure, noise is reduced. JP2014-116914A discloses such a noise reduction process.

When recording the drive signal of the noise source during a main exposure and reproducing the noise during a subsequent dark exposure by driving the noise source based on the recorded driving signal, such as described in JP2014-11691A, a power fluctuation that occurs when the main exposure is made cannot be reproduced in the dark exposure. Furthermore, the same driving process cannot be carried out in both the main exposure and the dark exposure due to a mechanical limitation. For example, when the position of the image pick-up apparatus in the main exposure is different in the dark exposure, a noise source such as an image stabilization mechanism cannot operate the same way in the dark exposure as the main exposure, due to a change in gravity.

SUMMARY OF THE INVENTION

This invention is directed to provide a method and apparatus for imaging an object that is capable of reading image-pixel signals while reducing noise properly.

An apparatus for imaging an object is equipped with an image sensor, according to the present invention has a plurality of pixels; a charge-reading processor that reads out accumulated charges in a given pixel via a pixel circuit of the charge accumulated pixel; and a noise-reading processor that reads out noise signals from a pixel circuit for a given pixel. The noise-reading processor reads noise signals from a pixel circuit for a pixel that is an object of noise acquisition, in parallel with the reading of accumulated charges by the charge-reading processor.

A method for imaging an object, according to another aspects of the present invention includes: a) reading out accumulated charges in a given pixel among a plurality of pixels provided in an image sensor, via a pixel circuit of the charge-accumulating pixel; b) reading out noise signals from a pixel circuit of a given pixel; and c) reading noise signals from a pixel circuit for a pixel that is an object of noise acquisition, in parallel with the reading of accumulated charges by said charge reading processor.

An image sensor unit, according to another aspects of the present invention has an image sensor comprising a plurality of pixels; a charge-reading processor that reads out accumulated charges in a given pixel via a pixel circuit of the charge accumulated pixel; and a noise-reading processor that reads out noise signals from a pixel circuit for a given pixel. The noise-reading processor reads noise signals from a pixel circuit for a pixel that is an object of noise acquisition, in parallel with the reading of accumulated charges by the charge-reading processor.

BRIEF DESCRIPTION OF THE DRAWINGS

Hereinafter, the preferred embodiments of the present invention are described with reference to the attached drawings.

DESCRIPTION OF THE PREFERRED EMBODIMENTS

Hereinafter, the preferred embodiments of the present inventions are described with reference to the attached drawings.

Figure 1:
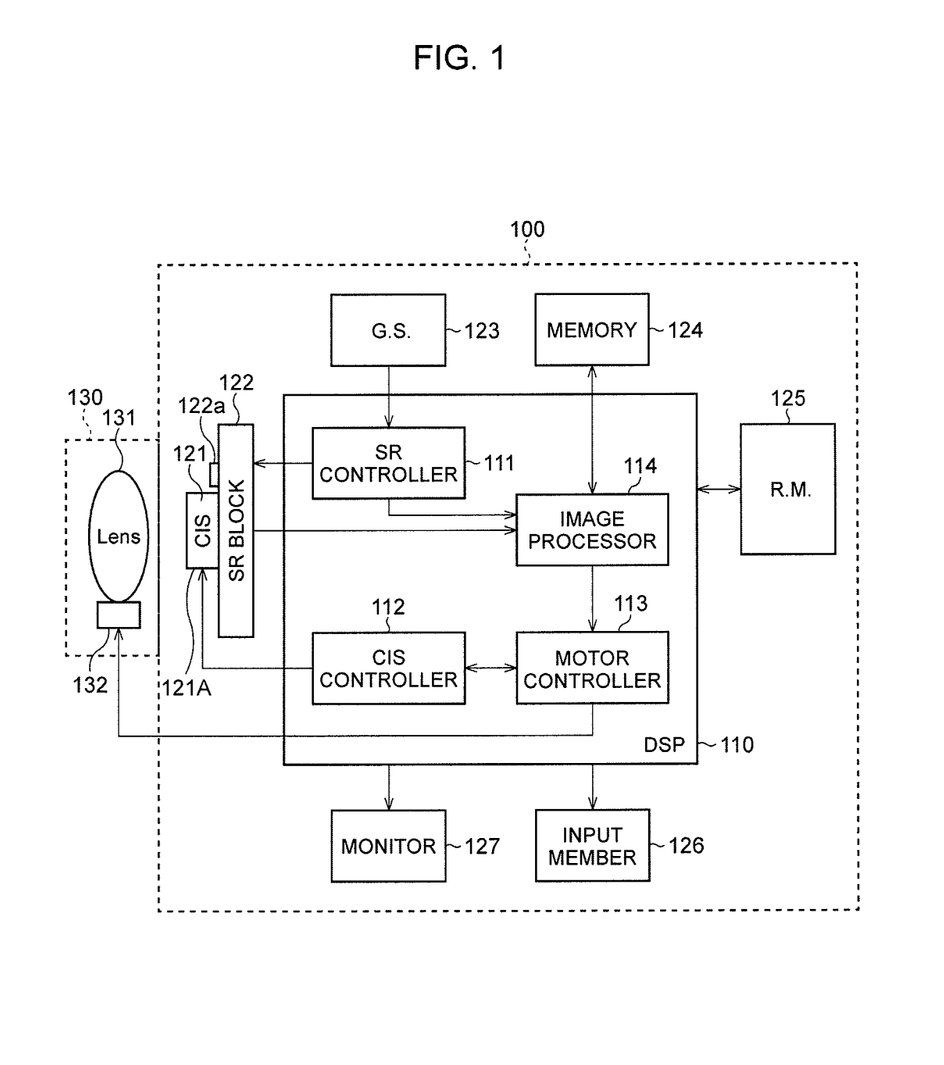
FIG. 1 is a block diagram of a digital camera according to the first embodiment.

FIG. 1 is a block diagram of a digital camera according to the first embodiment. A digital camera 100 is equipped with a DSP (Digital Signal Processor) having an image processor 114, an image sensor unit 121A including an image sensor 121, an SR (Shake Reduction) block 122 that is a noise source, a gyro sensor 123, a memory 124, a recording medium 125, an input member, and so on. The digital camera 100 is further equipped with an input member 126, a monitor 127 that is a display, a photographic lens or taking lens 130, and so on. The image sensor 121 herein is a CMOS type image sensor (hereinafter, called "CIS").

The photographic lens 130 is equipped with a lens 131 and a lens-driving motor 132, and is detachably attached to the digital camera 100. The photographic lens 130 forms an object image on the light-receiving area of the CIS 121. The lens-driving motor 132 includes a coil or magnetic body, which produces an electric noise when the lens driving motor 132 is driven.

In the CIS 121, a plurality of pixels is arranged in vertical (columns) and horizontal (rows) directions. Each pixel has a photoelectric converting element that receives light of an object through the photographic lens 130, converts the received light to an electric charge, and accumulates the electric charge. The accumulated electric charges in the plurality of pixels are output to the DSP 110 as one frame's worth of image-pixel signals.

The DSP 110 has an SR controller 111 that controls the SR block 122 of an image stabilization mechanism, a CIS controller 112 that controls the image sensor unit 121A, a motor controller that controls the lens-driving motor 132, and the image processor 114.

The image processor 114 receives image-pixel signals from the CIS 121 and generates an image or image file by performing an image process while utilizing a memory 124 as a temporary memory area. The generated image is displayed on the monitor 127 and recorded in the recording medium 125. The recording medium is detachably installed in the digital camera 100. For example, the recording medium is an SD card.

The motor controller 113 determines whether an object image is in focus or out of focus on the basis of a contrast in the object image, and drives the photographic lens 130 by sending a drive signal to the lens-driving motor 132 on the basis of the out-of-focus amount. The motor controller 113 also sends a lens-driving signal to the image processor 114 when driving the lens driving motor 132.

The gyro sensor 123 detects a vibration of the digital camera, i.e., an angular velocity, and sends a detection signal to the SR controller 111. The SR controller 111 calculates the necessary drive amount to compensate for a vibration (shake) of the camera 100 according to the detected angular velocity while the CIS 121 is exposed.

The SR block 122 has a voice coil motor 122a. When the SR block 122 receives the drive amount from the SR controller 111, electricity is provided the voice coil motor 122a in accordance to the drive amount, and the CIS 121 and the part of the SR block is shifted by a force generated by the voice coil motor 122a. Thus, the CIS 121 moves in a given direction to compensate for the vibration (shake) of the digital camera 100.

The voice coil motor 122a has a magnetic body and a coil, and generates a force by changing the direction and amount of electric current that flows in the coil. Furthermore, the voice coil motor 122a fixes the position of the CIS 121 by adjusting the electric current that flows in the coil. When the electric current that flows in the coil is changed, the voice coil motor 122a generates an electric noise.

The CIS controller 112 outputs a reading signal (drive signal) to the image sensor unit 121A and accumulated charges are read from the CIS 121 in accordance to the reading signal. At this time, signals that include a noise generated by the motion of the lens driving motor 132 (hereinafter, called "signal noise" or "noise data") and image pixel signals (hereinafter, occasionally called "pixel data") are concurrently read from the CIS 121 in the same one-frame interval.

Figure 2:
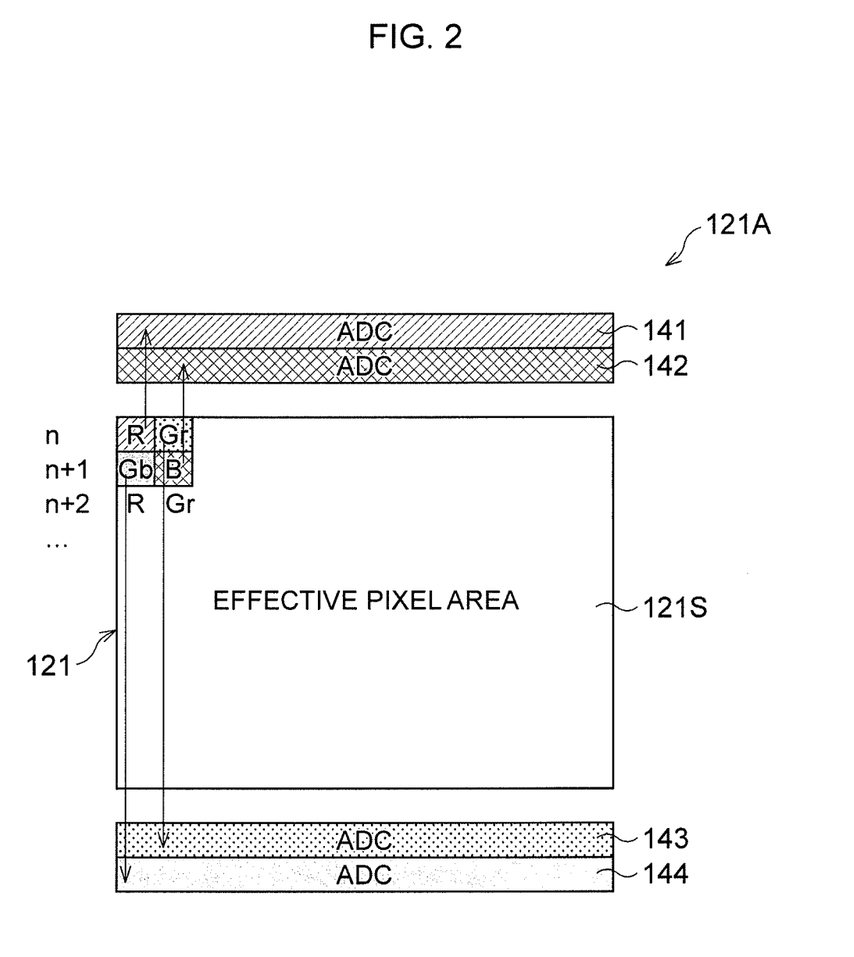
FIG. 2 is a view showing a construction of an image sensor unit including a CIS.

FIG. 2 is a view showing a construction of the image sensor unit 121A including the CIS 121.

On the light-receiving area of the CIS 121 a color filter array, in which color filters R, Gr, Gb, and B are Bayer-arrayed, is provided. The color filters R, Gr, Gb, and B constitute a block in which the color filters R and Gr neighbor one another and the color filters Gb and B neighbor one another along adjacent horizontal lines, respectively, and the color filters R and B, and the color filters Gr and Gb, are positioned diagonally across from one another, respectively.

On the circumference of an effective pixel area 121S, column A/D converters (hereinafter, called "column ADC circuits") 141, 142, 143, and 144 are provided for the color filters R, Gb, Gr, and B, respectively. Herein, the column ADC circuits 141, 142, 143, and 144, which corresponds to the number of pixels along one horizontal line, are provided along the top or upper side and the bottom or lower side of the effective pixel area 121S. The column ADC circuits 141 and 142 are provided at the upper side of the effective pixel area 121S, whereas the column ADC circuits 143 and 144 are provided at the lower side of the effective pixel area 121S.

In the case of the color filter array shown in FIG. 2, the column ADC circuits 141 and 142, which are provided at the upper side of the effective pixel area 121S, perform A/D conversion processing on an image-pixel signal (charge) that is read from a pixel corresponding to the color filter "R" (hereinafter, called an "R pixel") and a pixel corresponding to the color filter "B" (hereinafter, called a "B pixel"), respectively. On the other hand, the column ADC circuits 143 and 144, which are provided at the bottom side of the effective pixel area 121S, perform A/D conversion processing on an image-pixel signal that is read from a pixel corresponding to the color filter "Gb" (hereinafter, called a "Gb pixel") and a pixel corresponding to the color filter "Gr" (hereinafter, called a "Gr pixel"), respectively. As the column ADC circuits 141-144 are provided for colors "R, Gr, Gb, and B", respectively, i.e., one ADC circuit is provided for each color and two line's worth of image-pixel signals can be read from the CIS 121 simultaneously and be subjected to an A/D conversion process.

As for the arrangement of the column ADC circuits, one column ADC circuit or four column ADC circuits may be provided at both of the upper and lower sides of the effective pixel area 121S. Also, column ADC circuits may be provided at one side of the effective pixel area 121S. Furthermore, column ADC circuits may be provided at locations on the circumference of the effective pixel area 121S other than the upper and lower sides. Since the reading of image-pixel data and noise data can be performed in each pixel, various constructions of the reading of image-pixel data and noise data can be applied.

Figure 3:
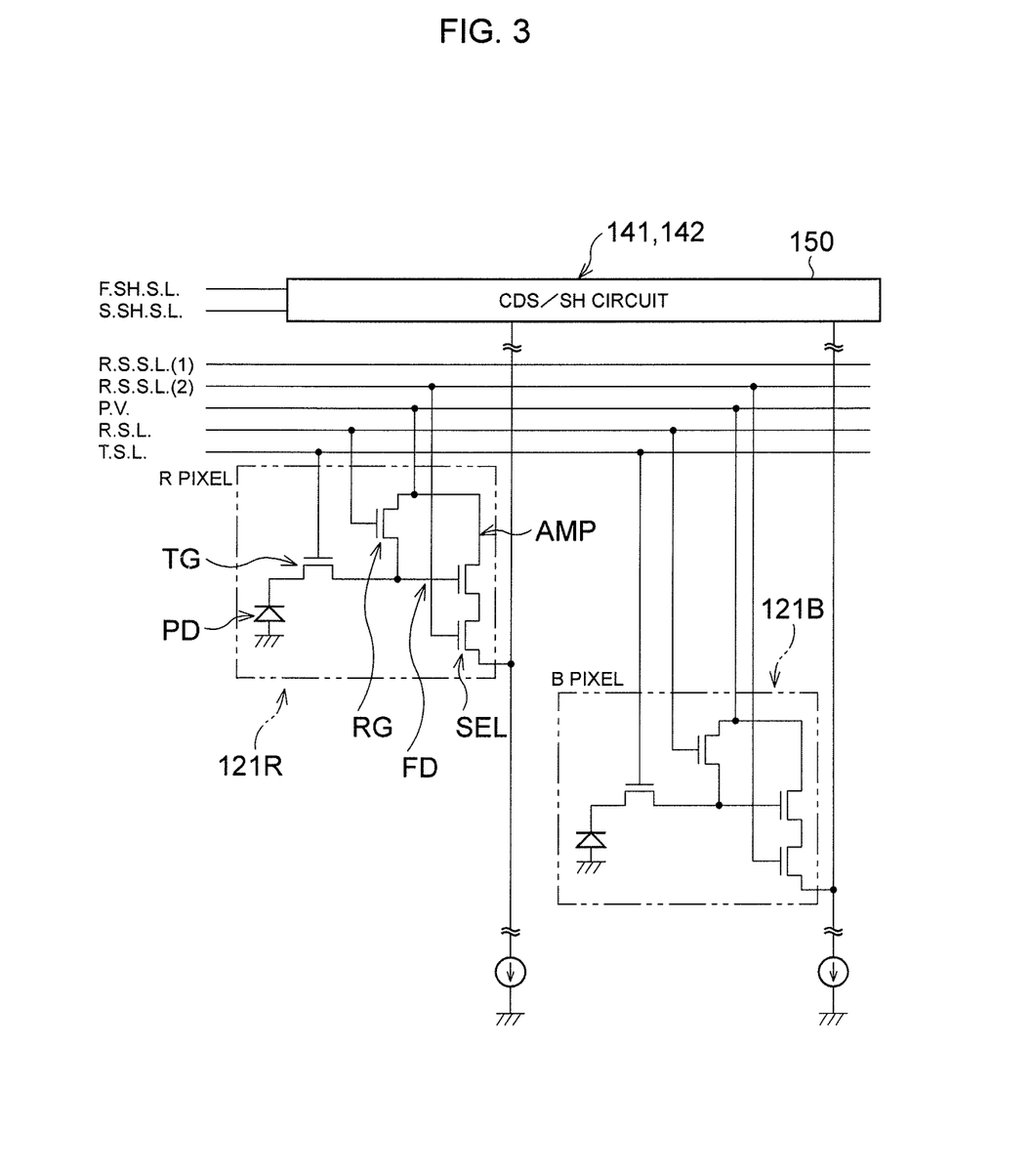
FIG. 3 is a view showing an arrangement of a pixel circuit.
Figure 4:
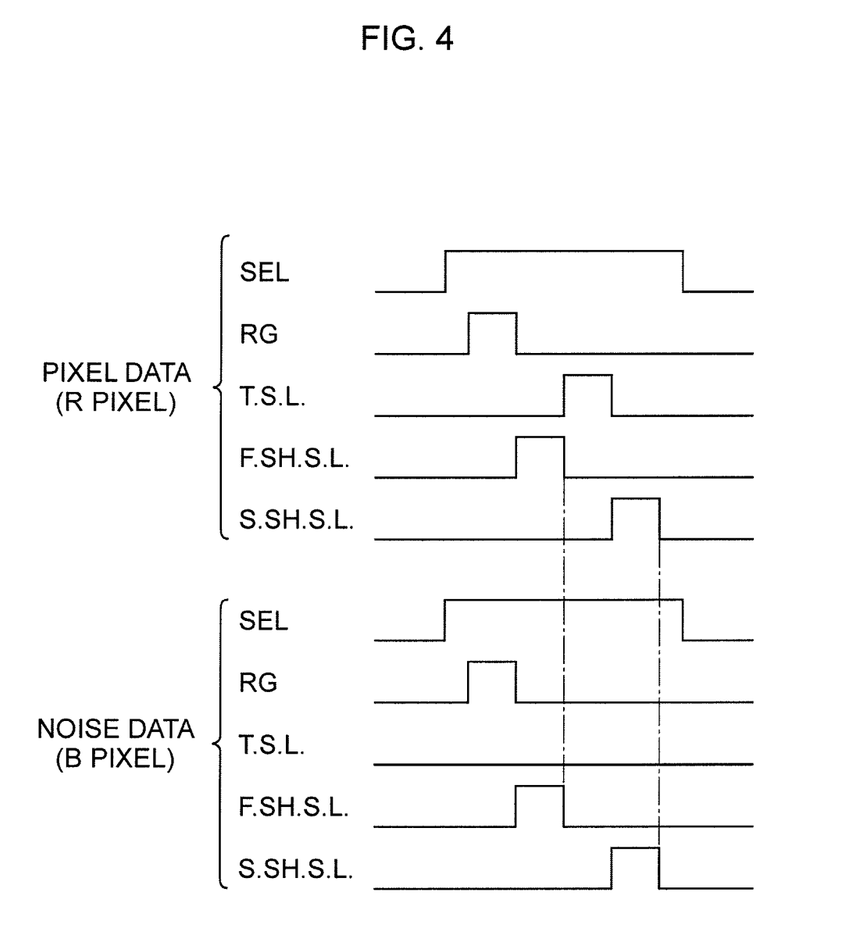
FIG. 4 is a timing chart of a reading process of image-pixel signals and noise signals.

FIG. 3 is a view showing an arrangement of a pixel circuit. FIG. 4 is a timing chart of a reading process of image-pixel signals and noise signals. With reference to FIGS. 3 and 4, the concurrent reading of the image-pixel signals and the noise signals is explained. Hereinafter, the image-pixel signals are read from pixels along a horizontal line including R pixels as pixel data, whereas noise signals are read from pixels along a horizontal line including B pixels as noise data.

A pixel circuit 121R corresponding to an R pixel has a photodiode PD, a transfer-gate TG, a reset gate RG, a floating-diffusion FD, an amplifying circuit AMP, and a selecting circuit SEL that selects a horizontal line to be read. A pixel circuit corresponding to a B pixel has a similarly constructed of pixel circuit. In the column ADC circuit 141 and 142, a CDS (Correlating Double Sampling)/hold circuit 150 is provided. For example, a single-slope-type ADC circuit is known as a column ADC circuit.

When reading image-pixel signals from the horizontal line including the R pixel, firstly, the floating diffusion FD is reset by a reset signal, i.e., the floating diffusion FD activates a reset gate. After the reset situation is released, the selecting switch SEL is turned on so that the reset signal is held by a first sample-hold (SH) signal line.

Charges accumulated in the photodiode PD are transmitted to the floating diffusion FD when the transfer gate TG is turned on by a transfer signal line. Then, when the selecting switch SEL is turned on after the transfer gate TG is turned off, a second SH signal line holds the charges, i.e., image-pixel signals.

By subtracting a reset signal held by the first SH signal line from image-pixel signals held by the second SH signal line, image-pixel signals, in which a reset noise component are removed, are read from the image sensor unit 121A. Namely, pixel data including charge information, which construct a photographic image, are read out.

On the other hand, as for the horizontal line including a B pixel, a reset signal is similarly held by the first SH signal line. However, the selecting switch SEL is turned on when the transfer signal line is in the OFF state, i.e., the transfer gate TG is in the OFF state, so that a reset signal is held by the second SH signal line. Then, a signal that subtracts the reset signal held by the second SH signal line from the reset signal held by the first SH signal line is read out as a noise signal or noise data. Namely, dark data without charge information are read out from the pixel circuit 121B.

As shown in FIG. 4, a signal held by the first SH signal line and a signal held by the second SH signal line are read out simultaneously. Therefore, when a change in voltage, fluctuation due to a change of magnetic field, and so on, occurs within an interval that a pixel signal of the R pixel is read out, the same or similar noise is superimposed on both of pixel signal corresponding to an R pixel and a pixel signal corresponding to a B pixel.

Gb and Gr pixels have the same pixel circuits. Namely, an image-pixel signal is read from the Gb pixel, whereas a noise signal is read from a pixel signal of the Gr pixel. After image-pixel signals are read out from the n horizontal line or row (see FIG. 2) and noise signals are read out from the n+1 horizontal line, image-pixel signals are read out from the (n+1) horizontal line that includes the Gb pixel and the B pixel, and noise signals are read from the (n+2) horizontal line that includes the Gr pixel and the R pixel. Such a concurrent and parallel reading of the image-pixel signals and noise signals are performed until one frame worth's of image data is obtained.

Figure 5:
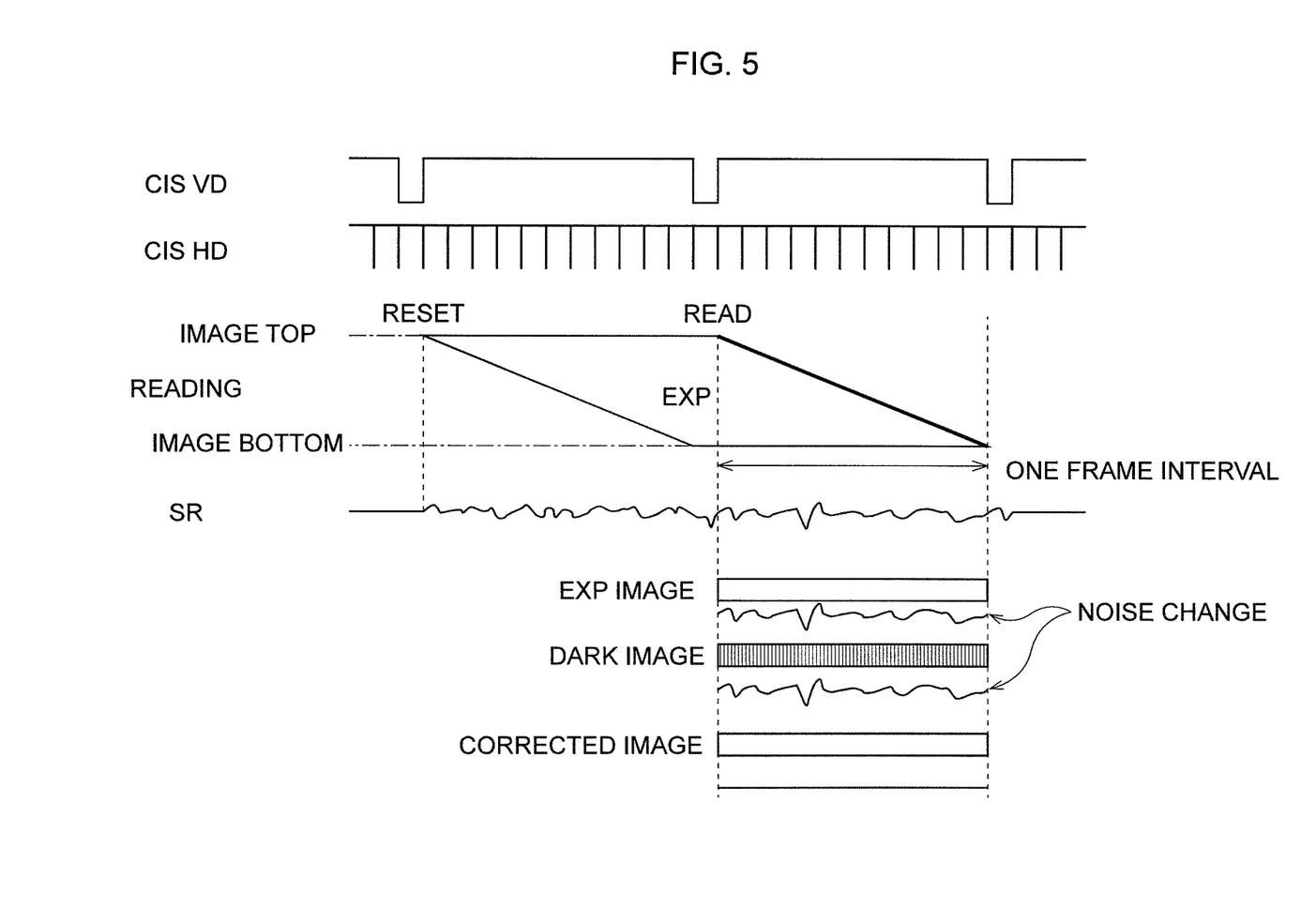
FIG. 5 is a timing chart of an image-pixel signal reading process over one frame of reading time.

FIG. 5 is a timing chart of an image-pixel signal reading process over one frame of reading time. Herein, image-pixel signals are read out by the rolling shutter method. However, a so called global shutter method may be used instead of the rolling shutter method.

In the CIS 121, one frame's worth of image-pixel signals are read out while synchronizing with a vertical synchronizing signal VD. Image-pixel signals in each line are successively read from the upper side to the lower side, line by line, in accordance to the rolling shutter method. At this time, the pixel signals are read out by the column ADC circuits 141 to 144 arranged at the upper and lower sides of the effective pixel area 121S.

On the other hand, as described above, the digital camera 100 has the SR block 122 that is an image stabilization mechanism. When photographing or capturing an image while an image-blur correction function is ON, an image-blur correction and a position holding process are carried out during an exposure interval and pixel signal reading interval.

Since the SR block has a voice coil, a magnet, a hall element, and so on, when electric current flows in the voice coil while the column ADC circuits 141-144 carry out processes, a change of magnetic field occurs at the circumference of the CIS 121, so that a noise streak or stripe occurs in a photographed image. Note that when a magnetic field is non-uniform in a horizontal line, a noise streak does not necessarily occur in the horizontal line entirely, instead a partial amount of noise occasionally occurs in the horizontal line. Also, when power fluctuates while the column ADC circuits 141-144 are carrying out processes, a similar noise streak occurs in a photographed image. As for the power fluctuation, it is known that a horizontal line having relatively large pixels for reading charges will cause a noise streak.

In the present embodiment, noise signals are read out concurrently with the reading of image-pixel signals, and image-pixel signals or noise signals are read out sequentially in each line at the same time, during one frame reading interval. Therefore, a noise change-in-time series during one frame-reading interval is the common element between the reading of the image-pixel signal and the reading of the noise signal (see FIG. 5).

Since magnetic field fluctuation and power fluctuation are the same those occurring in the image-pixel signals, noise that is the same as what is causing a noise streak in a photographed image can be superimposed on the noise signals (noise data). Therefore, corrected image-pixel signals without a noise streak can be obtained by subtracting noise data from pixel data. This noise reduction process (correction process) is herein carried out in an initial process (not shown), and corrected pixel data is transmitted to the DSP 110. However, image-pixel signals and noise signals may be simultaneously transmitted to the DSP 110 to carry out subtraction process in the DSP 110. Note that since noise data is obtained by pixels different from those used for a photographic image, positions of defective pixels are different from those of the image-pixel signals. In this case, a subtraction process may carry out after a defective-pixel correction process.

Figure 6:
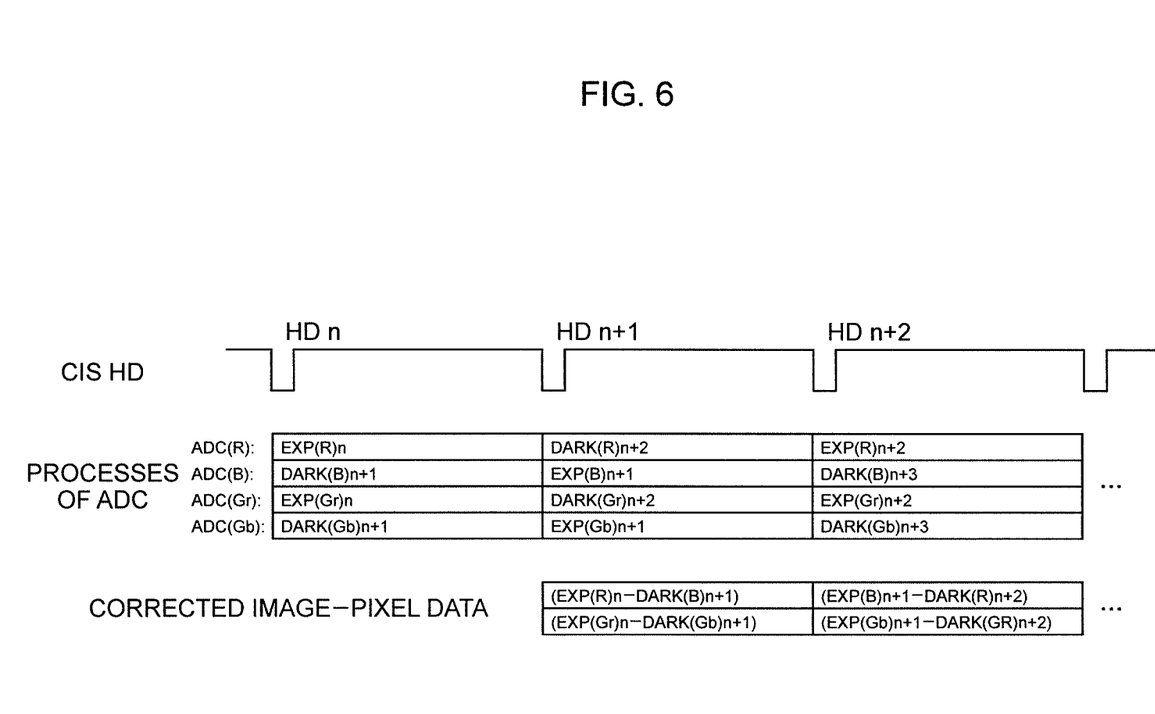
FIG. 6 is a timing chart of a reading of image-pixel signals and noise signals dependent upon a horizontal synchronizing signal HD.

FIG. 6 is a timing chart of a reading of image-pixel signals and noise signals dependent upon a horizontal synchronizing signal HD. Herein, the reading of image-pixel signals and noise signals is explained with respect to nth horizontal line in which R pixels and G pixels are adjacent to one another. In FIG. 6, image-pixel data is designated as "EXP", and noise data is designated as "DARK".

In an output interval of the horizontal synchronizing signal HDn, image-pixel signals are read from the nth horizontal line in which R pixels and Gr pixels are adjacent to one another, while concurrently noise signals are read from the n+1 horizontal line in which B pixels and Gb pixels are adjacent to one another, in parallel with the reading of image-pixel signals. Then, in the output interval of the horizontal synchronizing signal HDn+1, corrected pixel data that is obtained by subtracting noise data from image-pixel data, is A/D converted and output. Similarly for a Gb pixels and a Gr pixels, image-pixel signals and noise signals are simultaneously read out in the horizontal synchronizing signal HDn, and corrected pixel data is obtained in the horizontal synchronizing signal HDn+1. Corrected pixel data based on the horizontal synchronizing signals HDn+1 and HDn+2 are similarly obtained.

In this way, the corrected image-pixel data is obtained based on R and B pixels, or Gb and Gr pixels that are arranged in different horizontal lines adjacent to one another. Thus, an influence of shading (uneven brightness) due to non-uniform sensitivity of the CIS 121 is approximately the same with either the corrected image-pixel data based on R and B pixels and the corrected image-pixel data based on Gb and Gr pixels. Consequently, noise can be effectively reduced.

Also, the concurrent reading of image-pixel signals and noise signals are performed in the neighboring column ADC circuits 141 and 142, and the neighboring column ADC circuits 143 and 144. Thus, an influence of shading can be reduced similarly. Furthermore, when flux-breaking occurs, an amount of noise varies with in accordance to the distance between a noise source and a column ADC circuit. However, since the neighboring column ADC circuits read image-pixel signals and the noise signals, a proper noise component can be acquired.

When an offset component or gain characteristic is different between the neighboring column ADC circuits 141 and 142, a subtraction process may be modified based on the difference. Also, when performing a thinning process, i.e., a down sampling process, noise data can be obtained from horizontal line including neighboring pixels, at the thinning intervals, or noise data may be obtained from horizontal line that is not aligned with the a thinning horizontal line.

When obtaining image-pixel signals from the nth horizontal line, noise data may be obtained from the n−1 or the n+2 horizontal line. Also, when noise data is obtained from the n+1 horizontal line with respect to the nth horizontal line, which provides with image-pixel data, noise data may be subsequently obtained from the nth horizontal line, in parallel with the reading of image-pixel data in the n+1 horizontal line. Also, noise data may be obtained from a pixel that is apart from the pixel for reading the image-pixel data by a few pixel intervals or a few lines intervals. Furthermore, noise data may be obtained from dummy pixels that are arranged around the effective pixel area. For example, noise data can be obtained from a pixel circuit for a dummy pixel without a photoelectric conversion function.

In this way, the digital camera 100 according to the present embodiment has the CIS 121, which is a CMOS-type image sensor in which color filters R, Gb, Gr, and B are arrayed, and the SR block 122 that is an image stabilization mechanism. Furthermore, the column ADC circuits 141-144 corresponding to the color filters R, Gb, Gr, and B are arranged at the top and bottom sides of the effective pixel area 121S. Then, when reading accumulated charges (image-pixel signals) in each horizontal line, noise signals without accumulated charges are read from neighboring horizontal lines, in parallel with the reading of image-pixel signal with accumulated charges. Since the noise signals and image-pixel signals are read out concurrently in the same single-frame reading interval, a noise reduction process can be carried out rapidly. Also, since a noise component is superimposed on the image-pixel signals and noise signals at the same timing, the noise component can be precisely reduced from the read image-pixel signals.

Next, a digital camera according to the second embodiment is explained with reference to FIGS. 7-9. In the second embodiment, noise signals are read from a horizontal line after the reading of image-pixel signals from the horizontal line is complete, in order. Also, it is determined whether noise signals should be read out, on the basis of a state of image stabilization function (ON/OFF) and a set sensitivity level.

Figure 7:
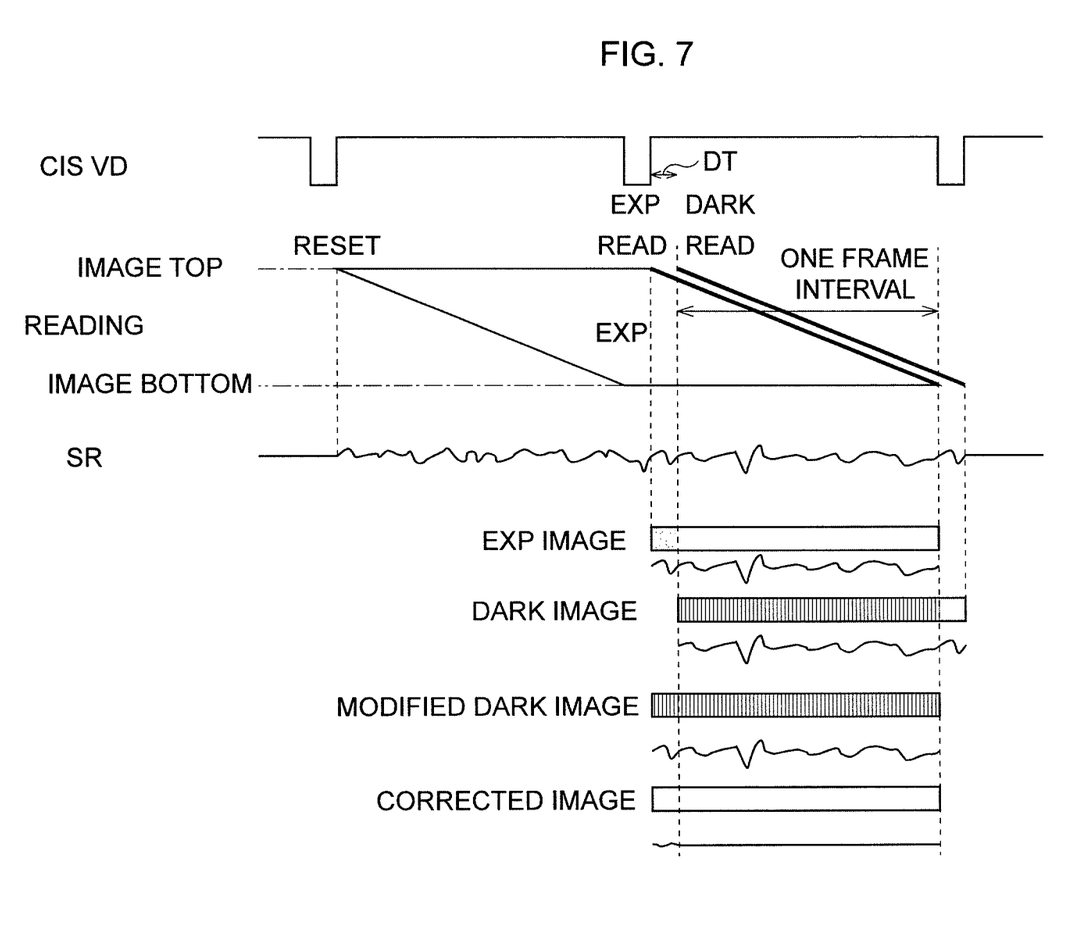
FIG. 7 is a timing chart of the reading process of the image-pixel signals and noise signals depending upon the vertical synchronizing signal VD, according to the second embodiment.

FIG. 7 is a timing chart of the reading process of the image-pixel signals and noise signals depending upon the vertical synchronizing signal VD, according to the second embodiment. Herein, the rolling shutter method is applied. However, the global shutter method may also be applied.

In the second embodiment, noise signals are read from the highest horizontal line to the lowest horizontal line, in order, and the reading of noise signals is carried out for each horizontal line after the reading of accumulated charges is finished. Since the reading of noise signals is performed after the reading of the image-pixel signals is complete, a delay time DT occurs even though noise signals are read out as soon as possible reading the accumulated charges. Therefore, noise data that is the same as noise data obtained during the reading of accumulated charges are part of the noise signals. Also, comparing noise components included in one frame's worth of noise data with noise components included in one frame's worth of image-pixel data, a position (the number of rows) of a horizontal line including the same noise component is shifted by one line along the vertical direction between noise data and image-pixel data.

Drive signals (pulse signals) for the SR block 122, which is output during the delay time DT, are stored in the memory 124. After all image-pixel data are read out, the SR block 122 is driven based on the recorded driving signals to reproduce noise components in the delay time DT. On the other hand, for the different rows in which noise components are included, an alignment of noise data is carried out, as explained below. Note that in the case of the second embodiment, a noise-reduction process is carried out in the image processor 114.

Figure 8:
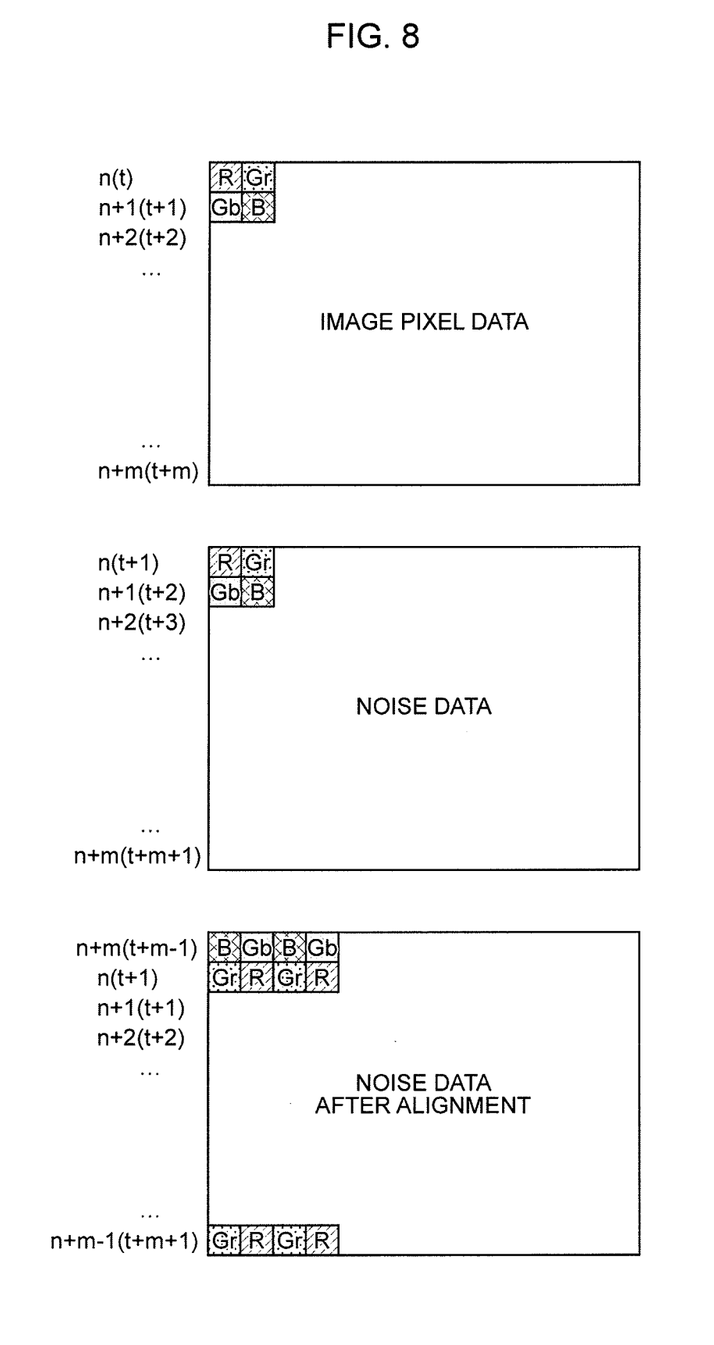
FIG. 8 is a view showing an alignment of noise data.

FIG. 8 is a view showing an alignment of noise data. In FIG. 8, it is shown that the reading of noise data is delay by one column relative to image-pixel data. For example, when reading image-pixel data from the n+1 column horizontal line in which pixel data (Gb, B) are arrayed at the time "t+1", noise signals are read from the nth column horizontal line in which pixel data (R, Gr) are arrayed.

In order to subtract noise data obtained at the same timing from pixel data, noise data is herein aligned with the position of a pixel. Namely, noise reduction processing is carried out using noise signal components that are located on a horizontal line shifted by one line. Furthermore, to carry out noise reduction processing based on image-pixel signals and noise signals that are read from the neighboring column ADC circuits 141 and 142, B and Gb pixels are replaced alternately. Gr pixel and R pixel are similarly replaced alternately. In FIG. 8, it is shown that the noise data of B pixels correspond to image-pixel data of R pixels when the alignment process is carried out.

Then, one frame worth's of noise data is generated based on the aligned noise data and is subtracted from photographic image data based on image-pixel data. At this time, noise data that is generated by driving the SR block 122 based on the driving signal recorded in the memory 124, is added. Thus, a noise streak due to magnetic fog can be reduced. Note that an alignment of noise data differs in accordance to an arrangement of the column ADC circuits. Also, as for noise components due to the effective pixel area 121S, one frame's worth of noise data for alignment purposes may be generated separately.

Figure 9:
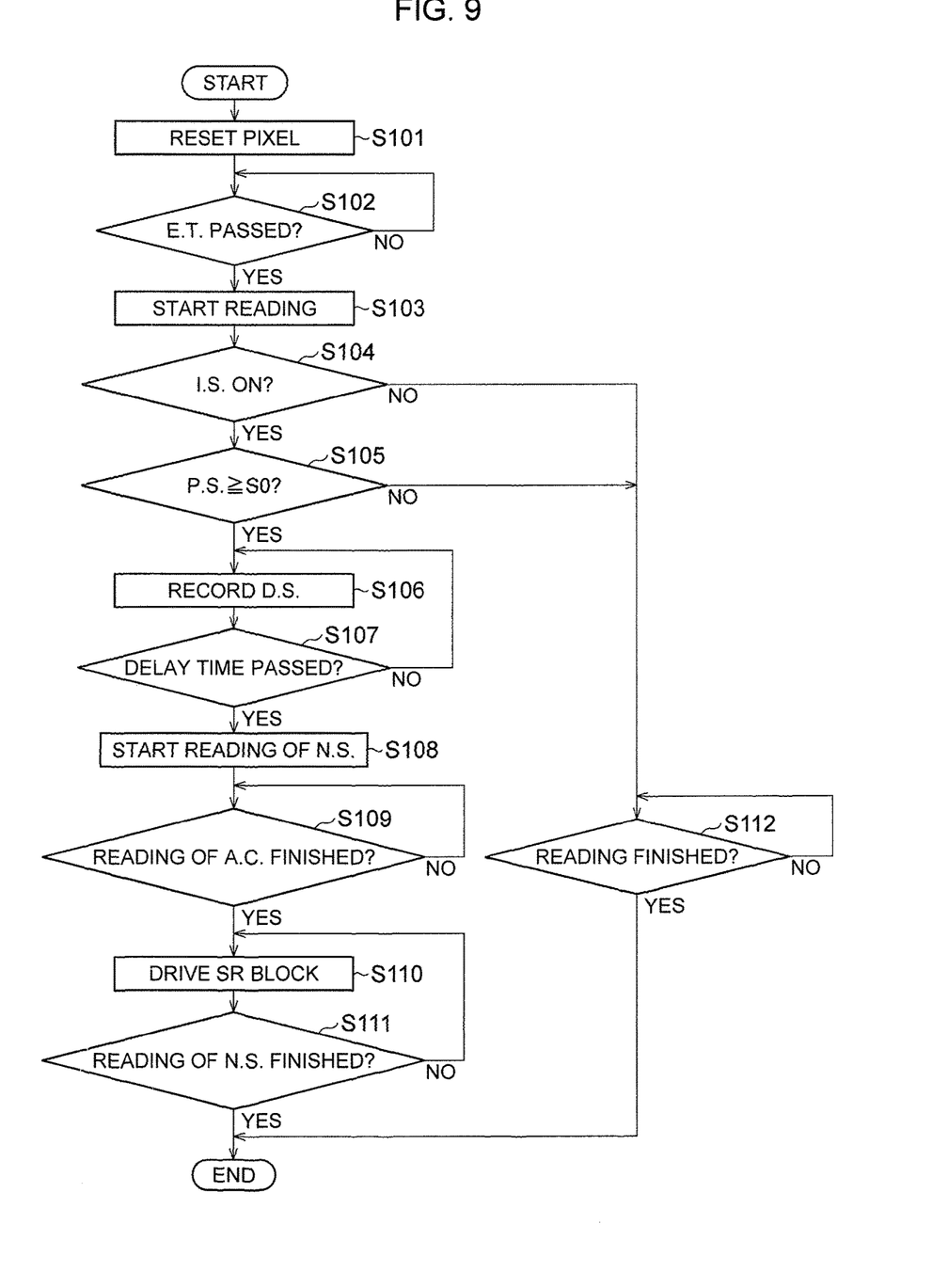
FIG. 9 is a flowchart of a series of photographic sequences according to the second embodiment.

FIG. 9 is a flowchart of a series of photographic sequences according to the second embodiment. The sequences are started when a release button is depressed.

When an exposure time has passed after the accumulation of charges starts, the reading of accumulated charges is started (S101 to S103). Herein, accumulated charges are read out in each line via the floating diffusion FD.

In Step S104, it is determined whether an image stabilization function is in the ON state or not. When it is determined that the image stabilization function is not in ON state (OFF state), a noise reduction process is not carried out since a member (such as a voice coil) that causes a noise streak does not acts. When the reading of accumulated charges is finished, the process is terminated (S112).

When it is determined in Step S104 that the image stabilization function is in the ON state, it is determined whether a set or predetermined photography sensitivity value such as an ISO sensitivity value is equal to or larger than a predetermined value "S0" (S105). Since a noise streak remarkably occurs when the sensitivity is high, the performance of the noise-reduction process is determined in accordance to the sensitivity value. When it is determined that the set sensitivity value is smaller than the predetermined value, the noise-reduction process is not carried out (S112).

When it is determined that the set sensitivity value is equal to or larger than the predetermined value "S0", driving signals fed to the SR block 122 are stored in the memory 124 until the reading of noise signals is started (S106, S107). When a delay time DT has passed, noise signals are read from a horizontal line that the reading of accumulated charges (image-pixel signals) has is completed (S108), in order. When the reading of accumulated charges has finished, the SR block 122 is driven based on the driving signals stored in the memory 124 to acquire noise data corresponding to the delay time DT (S109-S110). When one frame's worth of noise data is acquired, the process is terminated (S111).

As for the color filter array, arbitrary color filters other than R, Gr, Gb, and B may be arrayed. Also, an image sensor other than CMOS type image sensor may be applied.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2016-173752 (filed on Sep. 6, 2016), which is expressly incorporated herein by reference, in its entirely.

The invention claimed is:

1. An apparatus for imaging an object, comprising:
 an image sensor comprising an effective pixel area having a plurality of pixels;
 a charge-reading processor that reads out accumulated charges in a given pixel of the effective pixel area via a pixel circuit of the charge accumulated pixel; and
 a noise-reading processor that reads out noise signals from a pixel circuit corresponding to a pixel that is within the effective pixel area and is an object of noise acquisition, in parallel with the reading of accumulated charges by said charge-reading processor,
 wherein the noise signals represent noise from the same frame as the accumulated charges.

2. The apparatus of claim 1, wherein said noise-reading processor reads a noise signal from a pixel circuit for a pixel that is different from a pixel that is the object of an accumulated charge reading.

3. The apparatus of claim 1, wherein said noise reading processor reads a noise signal from a pixel circuit for a pixel that is next to or apart from the pixel of the object of the charge-reading.

4. The apparatus of claim 1, wherein said noise-reading processor reads noise signals from pixel circuits for pixels after the reading of accumulated charges is completed.

5. The apparatus of claim 4, wherein said charge-reading processor reads accumulated charges in each horizontal line, said noise-reading processor reading noise signals from a horizontal line after the reading of accumulated charges is complete, in order, said noise-reading processor aligning pixel positions of noise signals that are read out concurrently with the accumulated charges with pixel positions of pixels in which the accumulated charges are read out.

6. The apparatus of claim 1, further comprising an image stabilization mechanism, said noise-reading processor recording driving signals that are sent to said image stabilization mechanism during a delay interval that lasts until the reading of noise signals starts, in a memory, said noise-reading processor drives said image stabilization mechanism based on the recorded driving signals after the reading of accumulated charges is complete, said noise-reading processor reading noise signals generated during the operation of said image stabilization mechanism.

7. The apparatus of claim 1, further comprising a first determiner that determines whether an image stabilization process is effective or not when photographic sequencing is performed, said noise-reading processor reading noise signals when the image stabilization process is effective.

8. The apparatus of claim 1, further comprising a second determiner that determines whether a set value of sensitivity is equal to or larger than a predetermined value when photographic sequencing is performed, said noise-reading processor reading noise signals when the set value of sensitivity is equal to or larger than the predetermined value.

9. The apparatus of claim 1, wherein said noise-reading processor allowing a pixel circuit to output a signal without reading an accumulated charge.

10. The apparatus of claim 1, further comprising a correcting processor that subtracts noise signal from image-pixel signals of the read accumulated charges.

11. The apparatus of claim 1, wherein said correcting processor performs a subtraction process after performing a correction of a defective pixel noise.

12. An apparatus for imaging an object, comprising:
 an image sensor comprising an effective pixel area having a plurality of pixels;
 a charge-reading processor that reads out accumulated charges in a given pixel of the effective pixel area via a pixel circuit of the charge accumulated pixel; and
 a noise-reading processor that reads out noise signals from a pixel circuit corresponding to a pixel that is within the effective pixel area and is an object of noise acquisition, in parallel with the reading of accumulated charges by said charge-reading processor,
 wherein said charge-reading processor reading accumulated charges in each horizontal line, said noise-reading processor reading noise signals along a horizontal line that is different from a horizontal line that is the object of an accumulated charge reading.

13. An apparatus for imaging an object, comprising:
 an image sensor comprising an effective pixel area having a plurality of pixels;
 a charge-reading processor that reads out accumulated charges in a given pixel of the effective pixel area via a pixel circuit of the charge accumulated pixel;
 a noise-reading processor that reads out noise signals from a pixel circuit corresponding to a pixel that is within the effective pixel area and is an object of noise acquisition, in parallel with the reading of accumulated charges by said charge-reading processor, and
 a plurality of signal processors that read accumulated charges of noise signals, signal processors that are provided on the same side of the effective pixel area and different from each other among the plurality of signal processors reading accumulated charges and noise signals, respectively.

14. The apparatus of claim 13, wherein signal processors neighboring one another read accumulated charges and noise signals, respectively.

15. The apparatus of claim 13, wherein said plurality of signal processors are provided in accordance to each color of a color filter array provided in said image sensor.

* * * * *